(No Model.)  2 Sheets—Sheet 1.

W. B. MANN.
DENTAL ENGINE.

No. 373,079.  Patented Nov. 15, 1887.

Witnesses

Inventor
William B. Mann
By his Attorneys
Boyden & Bailie

N. PETERS, Photo-Lithographer, Washington, D. C.

(No Model.) 2 Sheets—Sheet 2.
W. B. MANN.
DENTAL ENGINE.
No. 373,079. Patented Nov. 15, 1887.
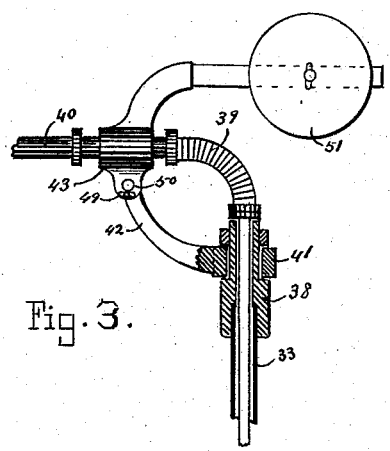
Fig. 3.
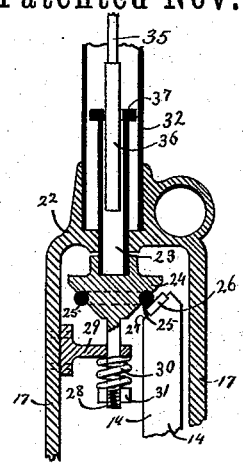
Fig. 4.
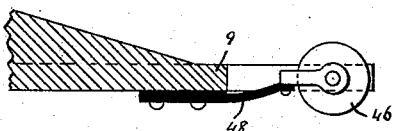
Fig. 6.
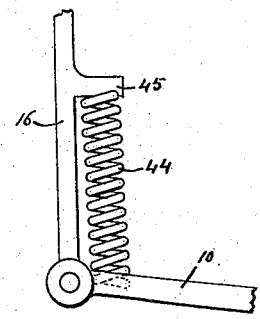
Fig. 5.
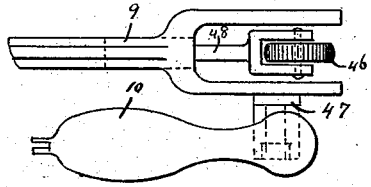
Fig. 6½.
Witnesses
J. H. Petzel.
C. B. Smith.
Inventor
William B. Mann
By his Attorneys
Boyden & Bailie.

UNITED STATES PATENT OFFICE.

WILLIAM B. MANN, OF BALTIMORE, MARYLAND.

DENTAL ENGINE.

SPECIFICATION forming part of Letters Patent No. 373,079, dated November 15, 1887.

Application filed June 6, 1887. Serial No. 240,484. (No model.)

*To all whom it may concern:*

Be it known that I, WILLIAM B. MANN, a citizen of the United States, residing at Baltimore, in the State of Maryland, have invented certain new and useful Improvements in Dental Engines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in dental engines which are used in the practice of dentistry for imparting a high rotating speed to drills, polishers, and like tools which are used in the practice of that art; and it consists in providing specially designed and constructed mechanism whereby direct frictional gearing may be employed for imparting the necessary high speed to the rotating mechanism, the said frictional gearing being self-adjustable, by which a uniform friction is maintained under all conditions between the two frictional wheels, and a steady and uniform motion will result therefrom.

The object of my invention is to substitute direct gearing for transmitting the necessary rotating movement, instead of the pulleys and belts now in common use, which are attended with considerable trouble in maintaining the proper tension and the breaking of the belts.

My improvements further consist in providing the said engine with a specially-designed universal joint, whereby the said operating-tools may be used at any angle. There is further provided an attachment which prevents the engine from stopping on its center, whereby the crank is always in a convenient position for operation, and for convenience of moving the engine about the floor specially-designed casters are fixed thereto, one of which becomes inoperative and permits the engine to rest solidly upon the floor when used in operating.

In the further description of my invention reference is had to the accompanying drawings, in which—

Figure 1:
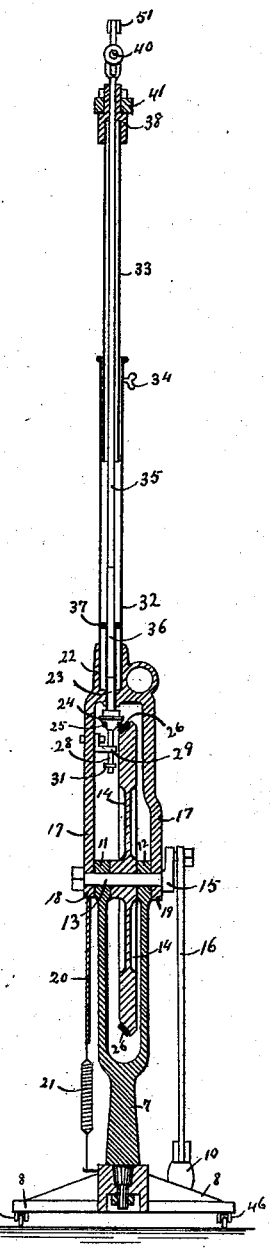
Figure 2:
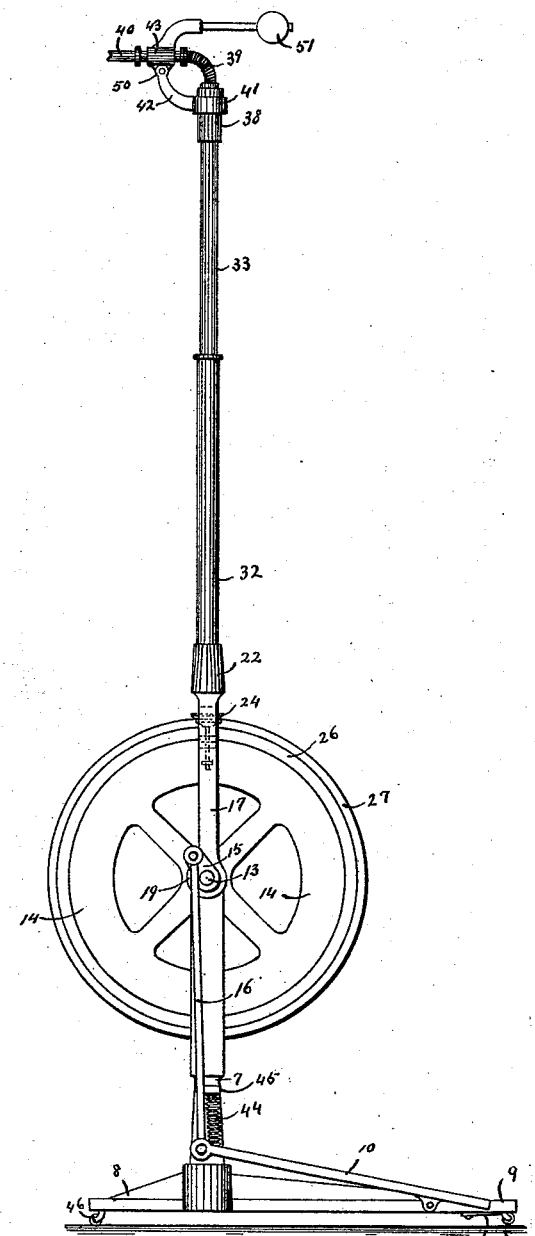

Figure 1 is a front elevation, in section, of the engine complete. Fig. 2 is a side elevation in full of the device. Fig. 3 is a detailed view of the universal joint. Fig. 4 is a detailed view of small frictional gear-wheel and its attachments. Fig. 5 is a detailed view of the device for keeping crank off of center. Fig. 6 is a detailed side view of adjustable caster, partly in section. Fig. 6½ is a plan of Fig. 6.

The same figures refer to the same or similar parts throughout the several views.

The figure 7 denotes the base-frame of the engine, which is provided with the feet 8 to secure a good foundation, the foot 9 being the longer, and to which is pivoted the treadle 10 for operating the mechanism. The frame 7 is forked and provided with the bearings 11 and 12, which support the rotating shaft 13, which has secured thereto the driving-wheel 14, which is caused to rotate between the jaws of the said frame 7 by means of the crank 15, which is operated in the usual manner by the connecting-rod 16 and the treadle 10.

Supported by the shaft 13, and free to vibrate therein, is the forked vibrating arm 17, which has its bearings 18 and 19—one on each of the projecting ends of the said shaft 13—one fork of the said vibrating arm 17 being provided with the extended arm 20, to which is attached one end of the spring 21, the other end thereof being secured to the base of the bottom frame, whereby the vibrating arm 17 is normally kept in a vertical position. At the crown of the said vibrating lever 17 is the enlarged part 22, which serves as a bearing for the spindle 23 of the bevel frictional wheel 24, that is caused to rotate by means of the cylindrical rubber band 25, with which it is encircled, resting upon and in frictional contact with the rubber surface 26, with which the beveled periphery 27 of the driving-wheel 14 is provided. The said bevel-wheel 24 is further fitted with the lower spindle, 28, which rotates in the guide 29, and insures a steady movement, the said spindle 28 extending sufficiently far through the said guide 29 to permit the spring 30 being placed thereon, which is backed at one end by the bottom of the guide 29 and at the other by the nut 31, Fig. 4, the lower part of the spindle 28 being threaded, whereby any tension may be put upon the spring 30, and the frictional contact between the bevel-wheel 24 and the frictional driving-wheel 14 be set at any desired pressure, the upper spindle, 23, of the said bevel-wheel 24 being free to be moved up or down in its bearing 22, by which arrangement the small bevel-wheel 24 will be kept in constant and uniform frictional contact with the rubber surface 26 of the driving-wheel 14.

Extending from the crown of the vibrating arm 17 is a telescopic casing, which consists of the standing post 32 and the movable post 33, which is free to slide therein, the set-screw 34 serving to lock the parts in position. Passing through this casing, and free to rotate therein, is the shaft 35, which is constructed with its bottom end, 36, square, as represented in Fig. 4, which moves telescopically in the spindle 23, which is bored out for this purpose, the upper end of the said spindle 23 having therein the cap 37, with a square hole, through which slides freely the square end of the shaft 35, by which device the twofold advantage of extending the shaft 35 and at the same time permitting a vertical movement to the bevel-wheel 24 is permitted.

Secured to the top of the casing 35 is the universal joint 38, which forms the upper bearing for the shaft 35, the end of the shaft extending outside the bearing, in order that the flexible shaft 39 may be attached thereto to convey motion to the small shaft 40, and from thence to the operating-tool. The said universal joint 38 is constructed with the loose collar 41, which has the arm 42 thereon, to which is pivoted, by the hinge 50, the bearing 43, in the manner illustrated, whereby a vertical movement of the free end of the small shaft 40 will be permitted, a clamping-screw, 49, being provided on this hinge 50, in order to lock the bearing 43 in any desired position, the loose collar 41 serving to permit a movement in the horizontal plane, the weight 51 serving to balance the device.

In order to prevent the crank 15 from stopping on its center, the spring 44 is provided, and is kept under tension, with its one end bearing against the projection 45, which is formed on the connecting-rod 16, the other end resting on the treadle 10, whereby an effort is made by the said spring 44 to bring the treadle 10 and the connecting-rod 16 in the same straight line, in which effort the crank will be kept off its center when not in operation, as represented in Fig. 2.

For convenience of moving the engine about the apartment, the casters 46 are provided, one of which is placed on either of the short feet 8, that on the long foot 9 being placed near the line with the bearing 47 of the treadle 10, and is supported by the spring 48, this spring being of sufficient tension to support this foot 9 when the engine is not in operation. The pressure of the foot upon the treadle 10 when in operation being sufficient to overcome the pressure of this spring 48, the caster will move in the space prepared in this foot for its reception, the foot will rest solidly upon the floor, and the engine will stand firm.

The manner of operating is as follows: The tool having been connected to the small shaft 40, which may be by either a stiff shaft or the ordinary flexible shaft in common use, motion is given the fly-wheel 14 by the treadle 10 and connecting-rod 16 in the usual manner. The cylindrical rubber band 25, with which the bevel-wheel 24 is provided, resting upon the rubber band 26, which forms the beveled periphery of the driving-wheel, is held thereat either by gravity or, preferably, by the spring 30, by which the frictional contact may be made more or less, as may be desired, and is caused to rotate at a high speed by the movement of the said driving-wheel 14, the construction of its spindle 23, as heretofore described, permitting a vertical movement to the said bevel-wheel 24, which will thus accommodate itself to any irregularities of the surface forming the periphery of the frictional driving-wheel, or any ordinary irregularity of motion thereof, insuring a constant friction of the contact-surfaces of the bevel-wheels, and a uniform motion results therefrom. The shaft 35 moves telescopically in the spindle 23 and receives its rotating movement therefrom by means of the cap 37, that is attached to the said spindle 23, and which is provided with the square opening for this purpose, as described, this telescopic movement permitting, with the casing 32 and 33, the shaft 35 to be extended or shortened to suit the convenience of the operator.

In order that free movement may be given the operating-tool, the universal joint 38 is provided, which operates as described, the flexible wire shaft 39 serving to carry motion to the small shaft 40 in a manner commonly employed. Movement to the hand-piece may be derived from either a flexible shaft or stiff shaft, as may suit the convenience of the operator.

When the engine is stopped, in consequence of the efforts of the spring 44 to bring the treadle 10 and the connecting-rod 16 in the same straight line, the crank 15 will be moved a little off from its top center, and will be in convenient position to again be put in operation. When the foot is removed from the treadle 10, in consequence of the lessened pressure at this point, the spring 48 will cause its caster to raise this foot 9 from the floor, and the engine may be conveniently moved about the apartment.

Having described my invention and the manner of operating, what I claim, and desire to secure by United States Letters Patent, is—

1. In a dental engine, the combination of the frictional driving-wheel 14, the frictional bevel-wheel 24, provided with the upper spindle, 23, and the threaded lower spindle, 28, the said frictional bevel-wheel 24 being free to move toward or from the center of the driving-wheel 14, the vibrating frame 17, provided with a bearing-plate, 29, through which rotates the spindle 28, the spring 30, placed around the spindle 28, one end thereof bearing upon the bearing-plate 29, the nut 31, threaded to the spindle 28 and supporting the other end of the spring 30, by which any desired frictional tension may be put between the bevel-wheel 24 and frictional driving-wheel 14, the shaft 13, and the spindle 35, for the purpose set forth.

2. In a dental engine, the combination of the frictional bevel-wheel 24 and frictional driving-wheel 14, the shaft 13, the spindle 35, and a universal joint, 38, consisting of the loose collar 41, the pivoted bearing 43, the set-screw 49, for clamping in any desired position the bearing 43, the spindle 40, the flexible wire shaft 39, and the counterpoise 51, for the purpose set forth.

3. In combination with a dental engine, the pitman 16, provided with the projecting arm 40, the treadle 10, and the spiral spring 44, placed under tension directly between the said projecting arm 40 and treadle 10 in such manner that one end of the said spring 44 presses on the projecting arm 40 and the other end thereof presses on the said treadle 10, for the purpose set forth.

4. In combination with a dental engine, the feet 8, provided with the casters 46, the foot 9, provided with a caster, 46, which is supported on a spring, 48, and a treadle, 10, attached to the said foot 9, for the purpose set forth.

In testimony whereof I affix my signature in presence of two witnesses.

WILLIAM B. MANN.

Witnesses:
WM. L. BAILIE,
JNO. T. MADDOX.